United States Patent
Kosaka (10) Patent No.: US 8,296,574 B2
(45) Date of Patent: Oct. 23, 2012

(54) FAILURE DIAGNOSIS METHOD

(75) Inventor: Hiroyuki Kosaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1182 days.

(21) Appl. No.: 11/783,737

(22) Filed: Apr. 11, 2007

(65) Prior Publication Data

US 2008/0133931 A1 Jun. 5, 2008

(30) Foreign Application Priority Data

Nov. 22, 2006 (JP) ................. 2006-316336

(51) Int. Cl.
  G06F 11/22 (2006.01)
  G06F 11/277 (2006.01)
  G06F 21/00 (2006.01)
(52) U.S. Cl. ............... 713/186; 726/7; 726/19; 714/25
(58) Field of Classification Search .............. 713/186
  See application file for complete search history.

(56) References Cited

U.S. PATENT DOCUMENTS

| | | | | |
|---|---|---|---|---|
| 6,959,105 B1 * | 10/2005 | Ishii et al. | | 382/124 |
| 7,134,016 B1 * | 11/2006 | Harris | | 713/168 |
| 2004/0016811 A1 * | 1/2004 | Fernandez et al. | | 235/462.01 |
| 2005/0138527 A1 * | 6/2005 | Gerety et al. | | 714/774 |
| 2005/0286746 A1 * | 12/2005 | Silvester | | 382/116 |
| 2008/0087720 A1 * | 4/2008 | Levitov | | 235/379 |
| 2010/0020970 A1 * | 1/2010 | Liu et al. | | 380/255 |

FOREIGN PATENT DOCUMENTS

| | | |
|---|---|---|
| JP | 2002-062803 | 2/2002 |
| JP | 2005-284452 | 10/2005 |
| JP | 2006-031304 | 2/2006 |

* cited by examiner

Primary Examiner — Jeffrey D Popham
Assistant Examiner — Alexander Lagor
(74) Attorney, Agent, or Firm — Staas & Halsey LLP (57) ABSTRACT

A method of detecting abnormality of an information processing apparatus to be started by biometric authentication without being started when the apparatus is inoperable. The information processing apparatus performs the biometric authentication using obtained biometric data of a user and pre-registered reference biometric data of the user in order to allow the apparatus to be used. When the apparatus cannot be started, the information processing apparatus outputs the reference biometric data, a detecting apparatus capable of obtaining the reference biometric data obtains the reference biometric data, the detecting apparatus obtains biometric data of the user and detects abnormality of the information processing apparatus by comparing the biometric data of the user obtained by the information processing apparatus and the obtained reference biometric data for authentication determination.

9 Claims, 11 Drawing Sheets

FAILURE DIAGNOSIS METHOD

BACKGROUND OF THE INVENTION

1. Field of the Invention

Various embodiments of the present invention relate to an information processing apparatus, a detecting apparatus and method thereof for detecting abnormality of the information processing apparatus.

2. Description of the Related Art

It has become important for a PC (Personal Computer) to implement a strong security feature in order to prevent problems such as external information exposure. Security features include, for example biometric authentication that unlocks a PC on the basis of biometric information, such as a fingerprint of a user, etc. In biometric authentication, matching is performed between the biometric data generated on the basis of a user's biometric information read by a biometric sensor and the reference biometric data to be a criterion of the user stored in the PC.

When a security feature, such as biometric authentication, is used in place of a password to lock a BIOS (Basic Input/Output System), the security feature is used before the OS (Operating System) is started. Thus, if the biometric authentication becomes impossible to be carried out by a failure of a biometric sensor, for example due to the destruction of reference biometric data, etc., the OS cannot be started even if the hard disk, etc., is replaced. In order to deal with such a situation, a specific password for a maintenance person is set in advance, and it has been customary for the maintenance person to start the OS using this password to identify the cause of the failure of the biometric authentication.

However, if a specific password for a maintenance person is set, a malicious third person might steal the password, and the OS might be started in an unauthorized manner.

Regarding security systems using biometric authentication, there are, for example techniques described in Japanese Unexamined Patent Application Publication Nos. 2002-062803, 2005-284452, and 2006-031304.

SUMMARY OF THE INVENTION

One aspect is a failure diagnosis method of an apparatus performing authentication by comparison of biometric data generated on the basis of biometric information of a user and reference biometric data of the user. The method comprising, outputting said reference biometric data on the apparatus, obtaining said reference biometric data outputted from the apparatus by a second apparatus, obtaining new biometric data on the basis of the biometric information of the user by the second apparatus, and performing authentication by comparison of said reference biometric data obtained by the second apparatus with the new biometric data to estimate the type of the failure of the apparatus.

According to the present invention, a detecting apparatus compares the biometric data generated on the basis of a user's biometric information and the reference biometric data obtained from the information processing apparatus to perform authentication determination. If the authentication is determined to be successful, the biometric data obtained and generated by the detecting apparatus is normal, and thus it is understood that the means for generating the biometric data held by the information processing apparatus is abnormal. Also, if the authentication is determined to have failed, it is understood that the reference biometric data stored in the information processing apparatus is abnormal, since the biometric data obtained and generated by the detecting apparatus is normal. Accordingly, it is possible to detect abnormality without starting the information processing apparatus using a specific password for a maintenance person.

DESCRIPTION OF THE PREFERRED EMBODIMENTS

In the following, a description will be given of an embodiment of the present invention with reference to the drawings. In the present embodiment, a description will be given of the case of using a fingerprint for biometric information. However, veins of a palm, an iris, etc., may be used for the biometric information.

Figure 1:
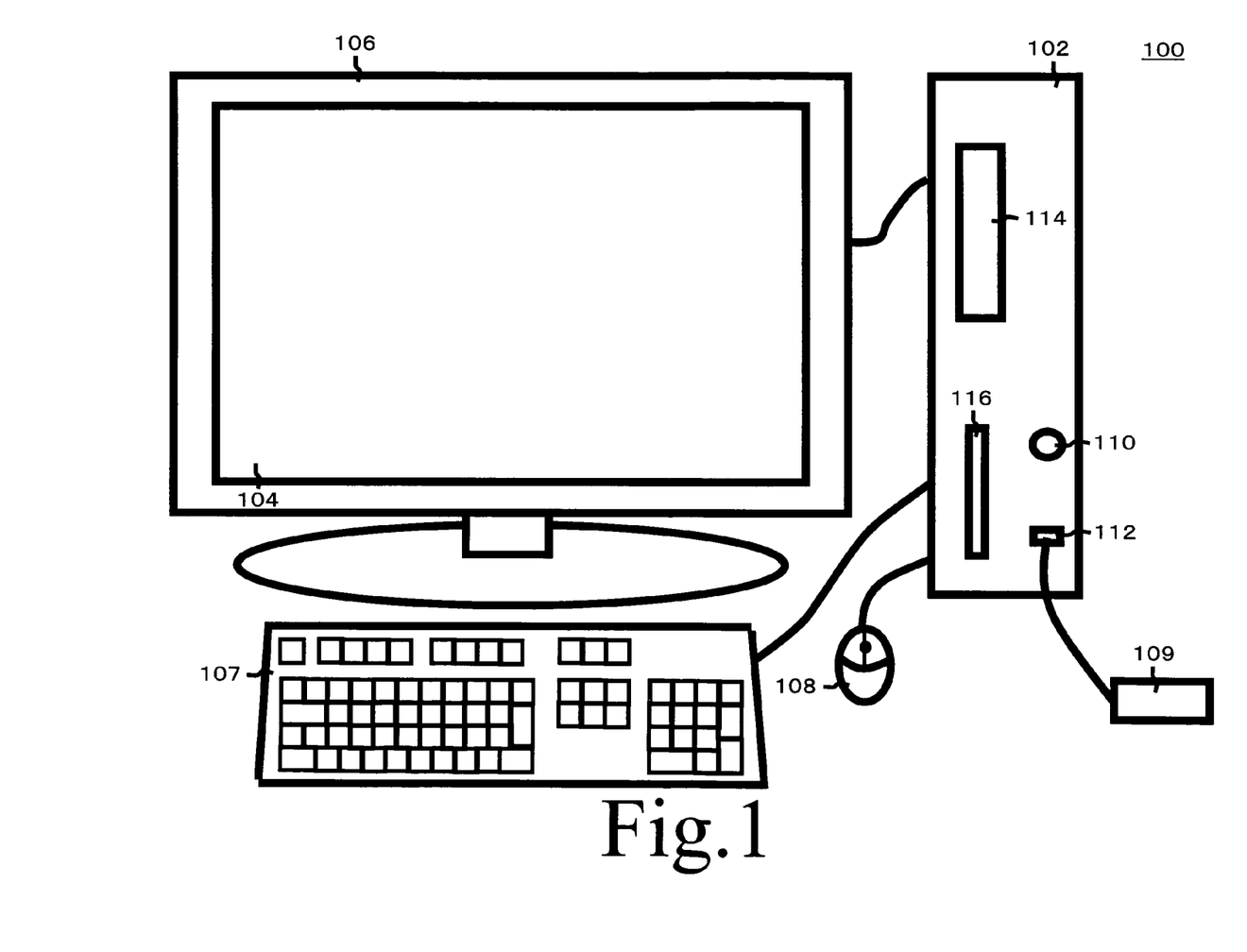
FIG. 1 is a schematic diagram of a personal computer.

Schematic Diagram of PC:

FIG. 1 is a schematic diagram of a PC.

A PC 100 includes a PC main unit 102 including a CPU (Central Processing Unit), a memory, etc., a display unit 106 for displaying images onto a display screen 104 by instructions from the PC main unit 102, a keyboard 107 for giving instructions to the PC main unit 102 by a user's operation, a mouse 108 for moving a cursor on the display screen 104 and giving an instruction in accordance with the icon on which the cursor is placed by button operations, and a biometric sensor 109 for generating biometric data to be, used for authentication of the user's biometric information.

Furthermore, the PC main unit 102 has a power button 110 for turning on the power to the PC 100, a USB connector 112 conforming to the USB (Universal Serial Bus) standard, a CD/DVD drive slot 114 into which a CD (compact Disc) or a DVD (Digital Versatile Disk) is inserted, and an FD drive slot 116 into which a FD (Floppy (a registered trade mark) Disk) is inserted.

Figure 2:
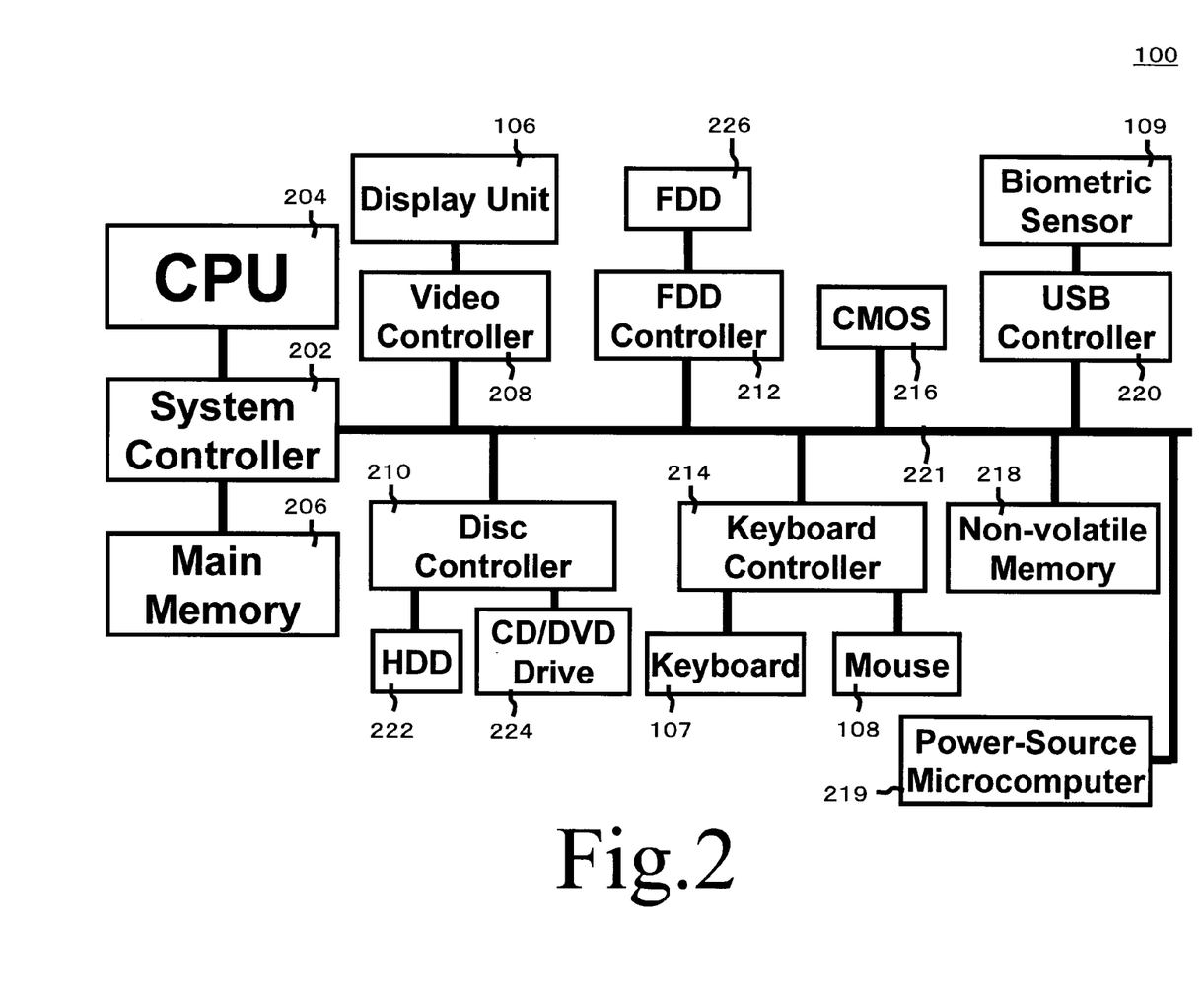
FIG. 2 is a diagram illustrating the entire hardware configuration of the personal computer.

Hardware Configuration Diagram of PC:

FIG. 2 is a block diagram schematically illustrating an example of the hardware configuration of the PC shown in FIG. 1. In this regard, the blocks described in FIG. 1 are marked with the same reference numerals.

The PC 100 has a configuration in which a CPU 204, a main memory 206, a video controller 208, a disc controller 210, an FDD controller 212, a keyboard controller 214, a CMOS (Complementary Metal Oxide Semiconductor) 216, a non-volatile memory 218, a USB controller 220, and a power-source microcomputer 219 are connected to a system controller 202 through a bus 221.

Furthermore, the display unit 106 is connected to the video controller 208, an HDD (Hard Disk Drive) 222 and a CD/DVD drive 224 are connected to the disc controller 210, an FDD 226 is connected to the FDD (Floppy (a registered trade mark) Disk Drive) controller 212, the keyboard 107 and the mouse 108 are connected to the keyboard controller 214, and the biometric sensor 109 is connected to the USB controller 220. In the following, a description will be given of each block.

System Controller:

The system controller 202 controls the entire system. CPU: The CPU 204 executes programs loaded into the main memory 206.

Main Memory:

A program read from the hard disk included in the HDD 222 is loaded into the main memory 206 to be executed by the CPU 204, and the main memory 206 is used for the working area for the execution of the program. Also, the biometric data, etc., of a user is stored into the main memory 206.

Video Controller:

The video controller 208 displays images onto the display unit 106 on the basis of the instructions of the CPU 204 output through the system controller 202. The message of successful authentication or an authentication failure, the two-dimensional code converted from reference biometric data by the data-conversion means 310 described below, etc., are displayed onto the display unit 106.

Disc Controller:

The disc controller 210 accesses the HDD 222 included in the PC main unit 102 and the CD/DVD inserted into the CD/DVD drive slot 114. The HDD 222 stores an OS, application programs, etc. These programs are read and loaded into the main memory 206 under the control of the disc controller 210, which has received instructions from the system controller 202.

FDD Controller:

The FDD controller 212 controls the FDD 226 that accesses an FD inserted into the FD drive slot 116.

Keyboard Controller:

The keyboard controller 214 transfers the input from the keyboard 107 and the mouse 108 to the system controller 202.

Non-Volatile Memory:

The non-volatile memory 218 stores the BIOS program to be executed first after the power to the PC is turned on, and the like. Also, the non-volatile memory 218 stores a user name and reference biometric data registered by a user in advance.

CMOS:

The CMOS 216 stores the settings of the BIOS menu.

USB Controller:

The USB controller 220 performs communication control conforming to the USB standard. Furthermore, the biometric sensor 109 is connected to the USB controller 220 through the USB connector 112. The biometric sensor 109 reads, as an image, a fingerprint that is the biometric information of the user.

Power-Source Microcomputer:

The power-source microcomputer 219 monitors whether the power button 110 has been operated.

Figure 3:
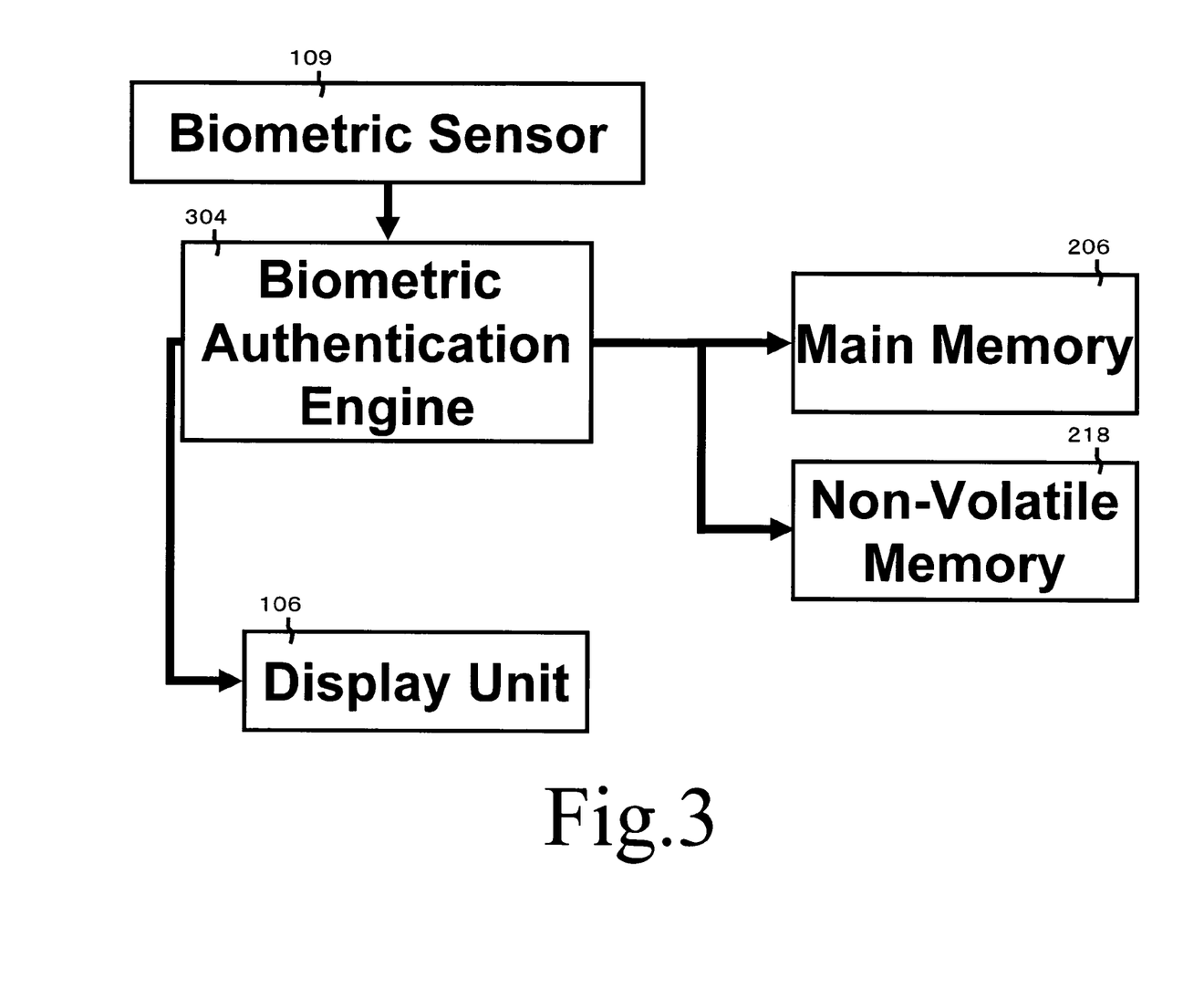
FIG. 3 is a functional block diagram of BIOS processing (1 of 2)

Functional Block Diagram of BIOS Processing (1 of 2):

FIG. 3 is a functional block diagram schematically illustrating an example of the BIOS processing function in normal mode. The BIOS processing function includes the biometric sensor 109, a biometric authentication engine 304, the main memory 206, the non-volatile memory 218, and the display unit 106. In the following, a description will be given of each block. In this regard, the blocks already described are marked with the same reference numerals, and the descriptions thereof are omitted.

Biometric Authentication Engine:

The biometric authentication engine 304 extracts characteristic points, such as starting points, joining points, and diverging points of the lines forming the fingerprint from a fingerprint image read by the biometric sensor 109, and generates the biometric data for performing the biometric authentication. Next, a determination is made on whether the authentication is successful or not on the basis of the matching ratio between the biometric data and the reference biometric data. Here, the matching ratio is referred to, for example, the ratio of the matching between the characteristic points held by the reference biometric data and the characteristic points held by the biometric data.

Figure 4:
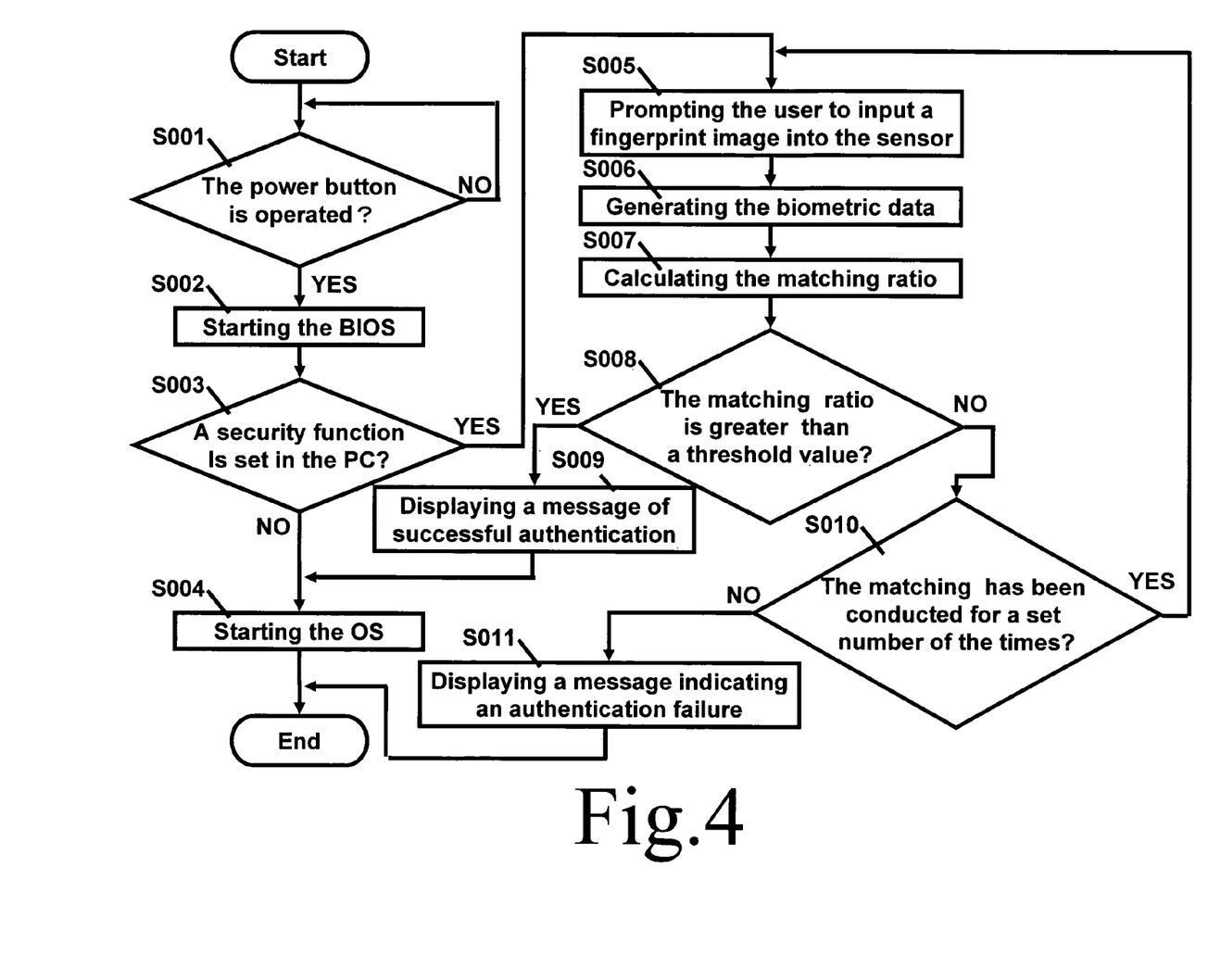
FIG. 4 is a flowchart of the BIOS processing in normal mode.

BIOS Processing Flow in Normal Mode:

In the following, a description will be given of the BIOS processing in normal mode using FIG. 4.

In step S001, the power-source microcomputer 219 determines whether the user has operated the power button 110. If the power button 110 has been operated, the processing proceeds to step S002.

In step S002, if the power button 110 has been operated, the CPU 204 starts the BIOS program stored in the non-volatile memory 218. When the BIOS program is started by the CPU 204, the BIOS program initializes the system controller 202. Then, the BIOS program is loaded into the main memory 206. The processing proceeds to step S003.

In step S003, the BIOS program determines whether a security function by biometric authentication is set in the PC 100 by checking whether a password is stored in the non-volatile memory 218. If the security function is set, the processing proceeds to step S005. On the other hand, if the security function is not set, the processing proceeds to step S004, and the BIOS program starts the OS.

In step S005, the BIOS program displays a message prompting the user to input a fingerprint image into the biometric sensor 109. The processing proceeds to step S006.

In step S006, the biometric authentication engine 304 generates the biometric data based on the user's fingerprint image. The processing proceeds to step S007.

In step S007, the biometric authentication engine 304 calculates the matching ratio between the biometric data generated in step S006 and the reference biometric data stored in the non-volatile memory 218. The processing proceeds to step S008.

In step S008, the biometric authentication engine 304 determines whether the matching ratio calculated in step S007 is greater than a threshold value set by the user. The threshold value set by the user is a value to determine that the authentication is successful if the matching ratio is greater than the threshold value. The user determines the threshold value on the basis of the security level to be achieved. If the matching ratio is greater than the threshold value, the processing proceeds to step S009. On the other hand, if the matching ratio is not greater than the threshold value, the processing proceeds to step S010.

In step S009, the BIOS program displays a message of successful authentication to the display screen 104. Then, the processing proceeds to step S004, and the BIOS program starts the OS. The processing terminates.

In step S010, the BIOS program determines whether the matching has been conducted for a set number of times. The following are the reasons for providing an allowance for the number of matching times. For example, if it is determined that the authentication has failed immediately when the matching ratio between the biometric data and the reference biometric data becomes low, because a finger is misplaced on the biometric sensor 109, the user feels troublesome. Also, if it is determined that the authentication has failed immediately when the matching ratio becomes low, because any one of the biometric sensor 109, the biometric authentication engine 304, and the reference biometric data is abnormal, it is not possible to determine whether the user has misplaced his/her finger, or any one of the biometric sensor 109, etc., is abnormal. In this regard, it is desirable to set the number of matching times to a value which does not make the user feel troublesome and makes it possible to determine whether the user has misplaced his/her finger or any one of the biometric sensor 109, etc., is abnormal. If the matching has been carried out for a set number of times, the processing proceeds to step S011, and the BIOS program displays a message indicating an authentication failure onto the display screen 104. On the other hand, if the matching has not been carried out for a set number of times, the processing returns to step S005, and the above-described processing is repeated.

Figure 5:
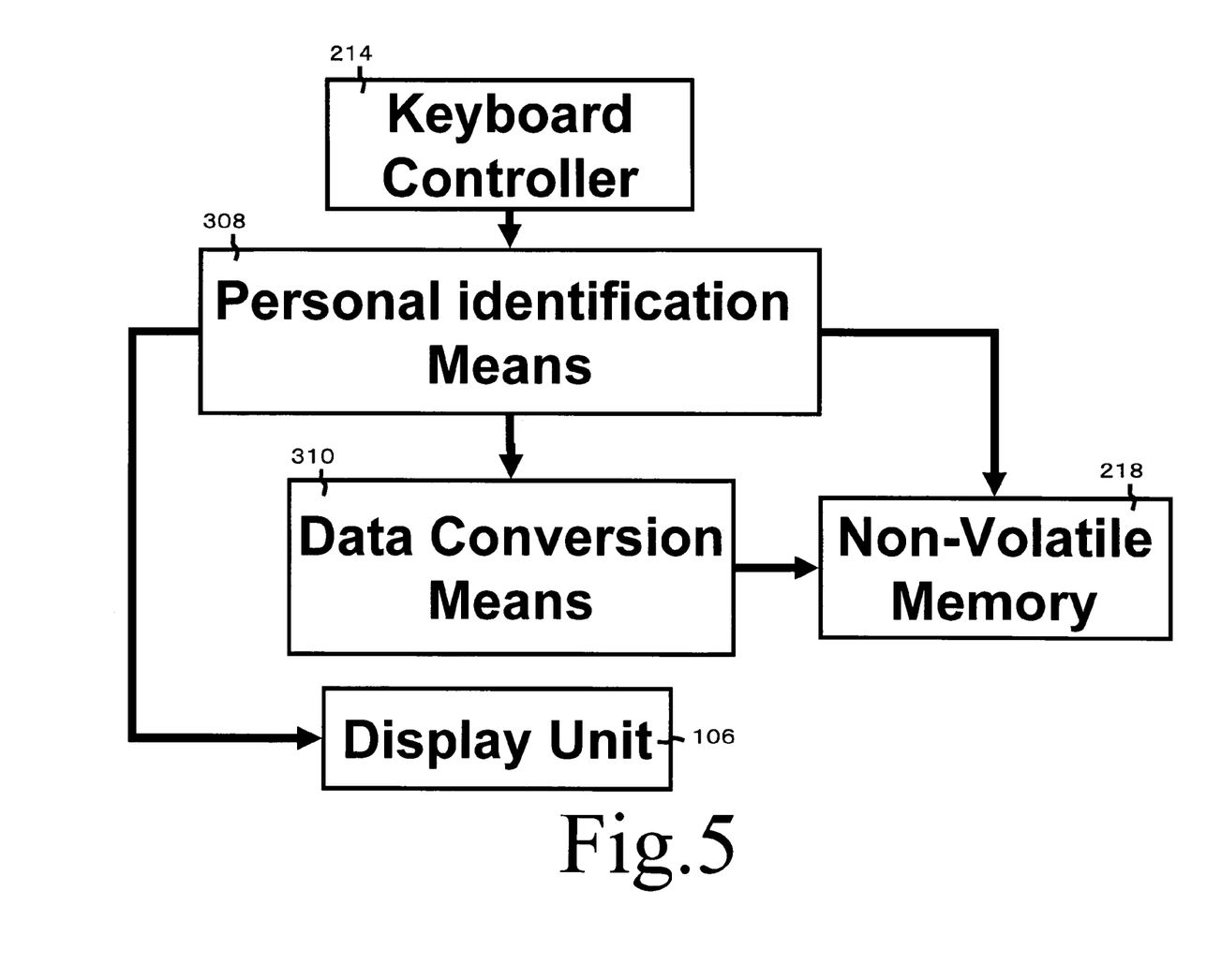
FIG. 5 is a functional block diagram of the BIOS processing (2 of 2)

Functional Block Diagram of BIOS Processing (2 of 2):

FIG. 5 is a functional block diagram schematically illustrating an example of the BIOS processing in maintenance mode. The maintenance mode is a mode which is started when the security function by the biometric authentication is abnormal. For example, the mode is started when a maintenance person detects abnormality of the security function. The BIOS processing function includes the keyboard controller 214, personal identification means 308, data conversion means 310, the non-volatile memory 218, and the display unit 106. In the following, a description will be given of each block. In this regard, the blocks already described are marked with the same reference numerals, and the descriptions thereof are omitted.

Personal Identification:

The personal identification means 308 compares the user name notified from the keyboard controller 214 and the user name registered in the non-volatile memory 218 in advance, and carries out personal identification.

Data Conversion Means:

The data conversion means 310 converts the reference biometric data stored in the non-volatile memory 218 into a two-dimensional code.

BIOS Processing Flow in Maintenance Mode:

In the following, a description will be given of the BIOS processing in maintenance mode using FIG. 6.

In step S101, the power-source microcomputer 219 determines whether the user has operated the power button 110. When the power button 110 has been operated, the processing proceeds to step S102.

In step S102, when the power button 110 has been operated, the CPU 204 starts the BIOS program stored in the non-volatile memory 218. When the BIOS program is started by the CPU 204, the BIOS program initializes the system controller 202. Then, the BIOS program is loaded into the main memory 206. The processing proceeds to step S103.

In step S103, the BIOS program displays a message requesting the user to input the user name to the display screen 104. The processing proceeds to step S104.

In step S104, the personal identification means 308 compares the user name input by the user and the user name stored in the non-volatile memory 218 to determine whether both of the user names match. If the user names match, the processing proceeds to step S106. On the other hand, if the user names do not match, the processing proceeds to step S105.

In step S105, the personal identification means 308 displays a message stating that the user names do not match onto the display screen 104. In this regard, although omitted to be shown in the flowchart, for example, if the user names do not match when the user name is repeatedly input three times, the BIOS program may display a message stating that personal identification cannot be carried out because the user names do not match onto the display screen 104.

In step S106, the data-conversion means 310 converts the reference biometric data stored in the non-volatile memory 218 into a two-dimensional code, and displays the code onto the display screen 104. FIG. 7 illustrates a state in which the two-dimensional code 312 is displayed on the display screen 104. By this means, it is possible for the detecting apparatus described below to obtain reference biometric data from the PC 100 through the display screen 104 that can be used without starting the OS. In this regard, the reference biometric data is encrypted at the time of the conversion. Thus, it is possible to maintain security even if the two-dimensional coded reference biometric data is displayed onto the display screen 104. The processing terminates.

Figure 8:
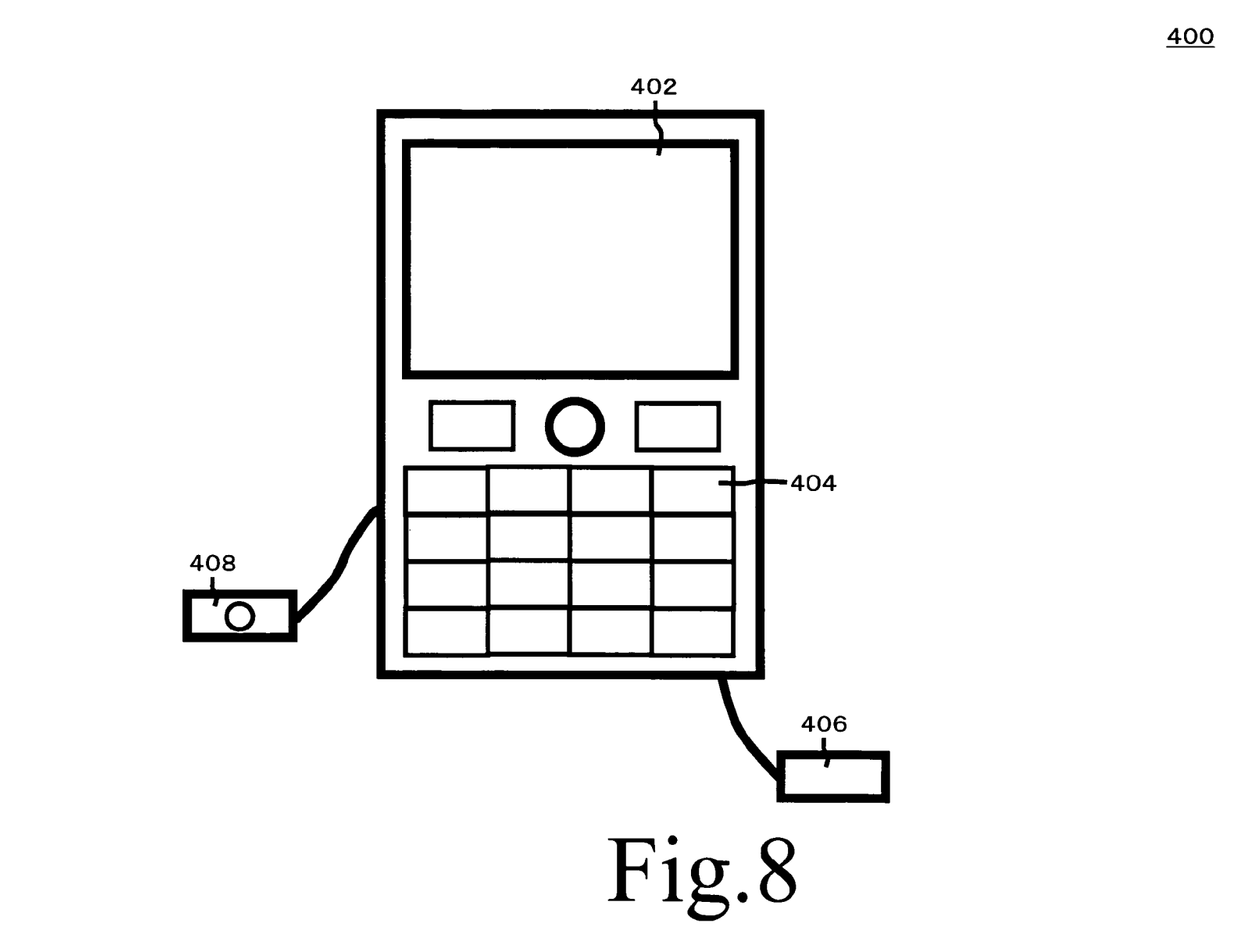
FIG. 8 is a schematic diagram of a detecting apparatus.

Schematic Diagram of Detecting Apparatus:

FIG. 8 is a schematic diagram of a detecting apparatus.

The detecting apparatus 400 includes a display section 402 for displaying various kinds of information, an operation section 404 for accepting data input from the user, a biometric sensor 406 for reading the user's biometric information as an image, and an imaging device 408 for capturing an image.

Figure 9:
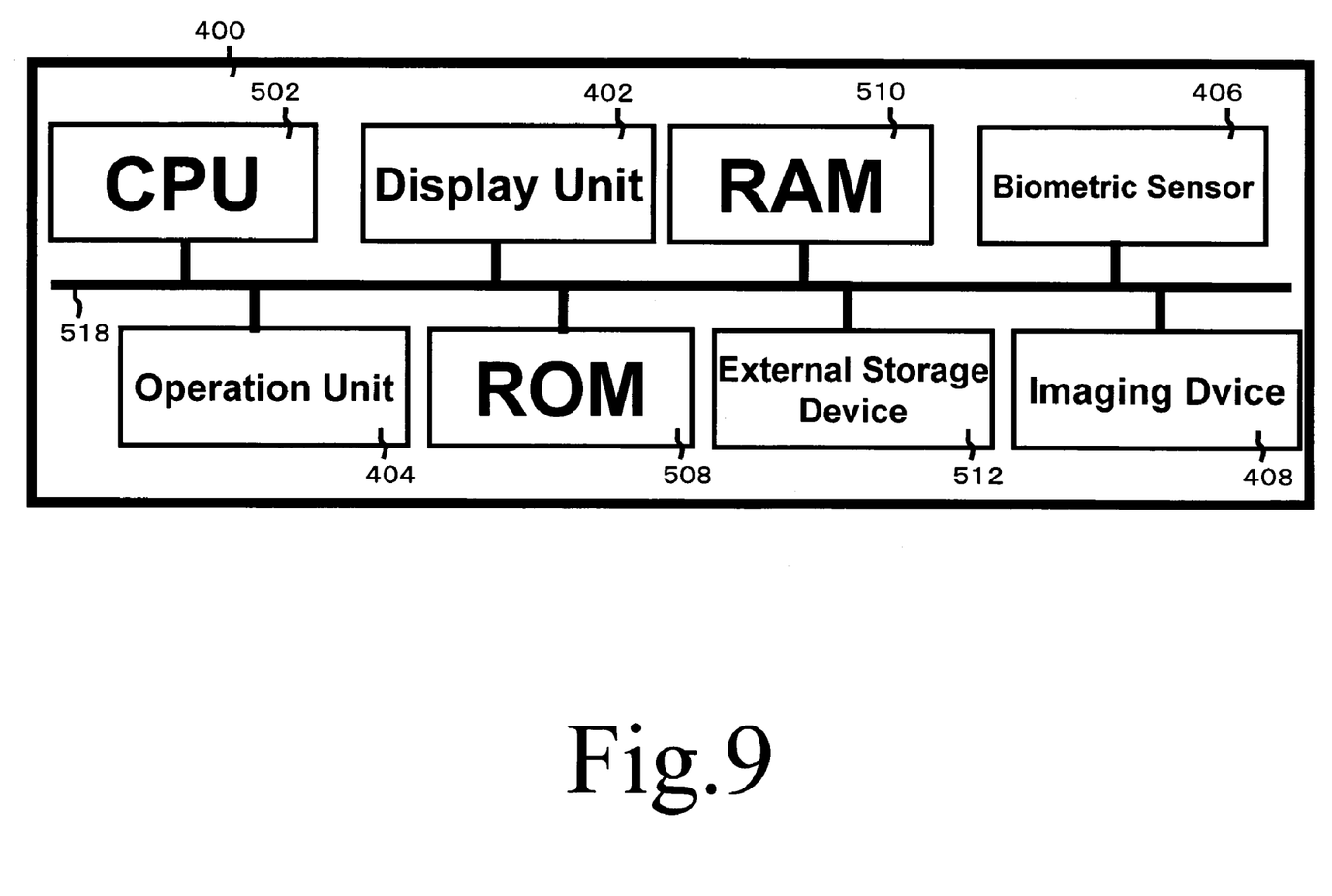
FIG. 9 is a diagram illustrating the entire hardware configuration of the detecting apparatus.

Hardware Configuration Diagram of Detecting Apparatus:

FIG. 9 is a block diagram schematically illustrating an example of the hardware configuration of the detecting apparatus. The detecting apparatus 400 includes a CPU 502 for executing various kinds of calculation processing, an operation section 404, a display section 402, a ROM 508 for storing various programs, a RAM 510 for executing the programs and storing data, an external storage device 512 for storing the OS, the biometric authentication programs, etc., a biometric sensor 406, and an imaging device 408, which are connected through a bus 518.

When an instruction to detect abnormality of the PC 100 is given from the operation section 404 by the user, the CPU 502 instructs the imaging device 408 to read a two-dimensional code displayed on the display screen 104 of the PC 100. The two-dimensional code read by the imaging device 408 is converted into reference biometric data, and is stored into the RAM 510. Next, the CPU 502 displays a message prompting the user to input biometric information using the biometric sensor 406 onto the display section 402. The biometric sensor 406 reads the biometric information of the user as an image. The CPU 502 reads the biometric authentication program from the external storage device 512, loads the program into the RAM 510, and executes the biometric authentication program. The biometric authentication program generates the biometric data from the image of the biometric information read by the biometric sensor 406, and performs the biometric authentication by matching the biometric data and the reference biometric data.

Figure 10:
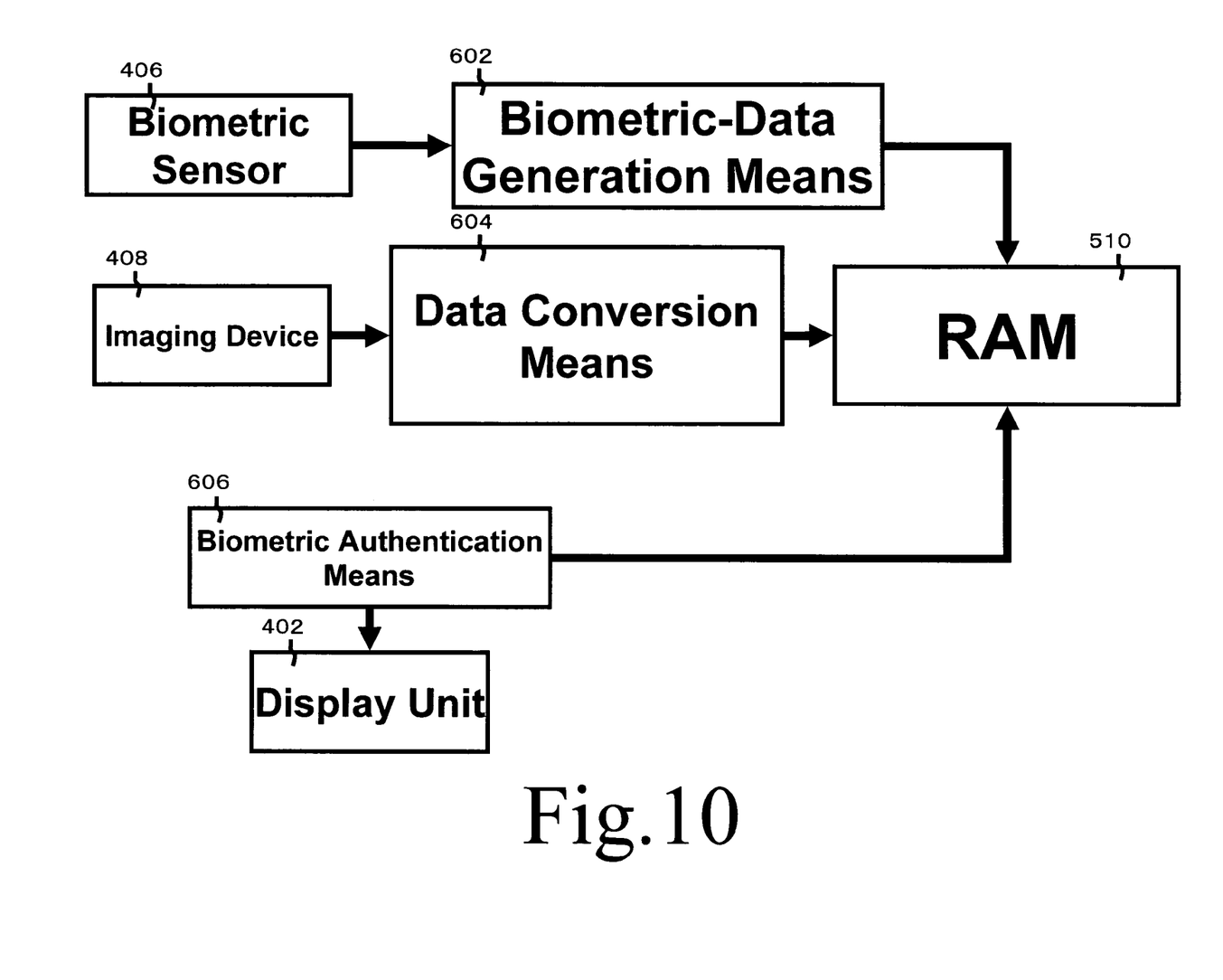
FIG. 10 is a functional block diagram of abnormality detection processing.

Functional Block Diagram of Abnormality Detection:

FIG. 10 is a functional block diagram schematically illustrating an example of an abnormality detecting function. The abnormality detecting function includes the imaging device 408, data conversion means 604, the biometric sensor 406, biometric-data generation means 602, biometric authentication means 606, the RAM 510, and the display section 402. In the following, a description will be given of each block of the abnormality detecting function.

Imaging Device:

The imaging device 408 captures an image. In the present embodiment, the imaging device 408 captures the two-dimensional code displayed on the display screen 104 of the PC 100.

Data Conversion Means:

The data conversion means 604 converts the two-dimensional code captured by the imaging device 408 to generate the reference biometric data to be a criterion for the user.

Biometric Sensor:

The biometric sensor 406 reads a fingerprint, which is the biometric information of the user, as an image. Then, the biometric sensor 406 instructs the biometric-data generation means 602 to generate the biometric data on the basis of the image of the read fingerprint.

Biometric Data Generation Means:

The biometric-data generation means 602 extracts the characteristic points, etc., from the image of the fingerprint read by the biometric sensor 406, and generates the biometric data in order for the biometric authentication means 606 to carry out biometric authentication

RAM:

The RAM 510 stores the biometric data generated by the biometric-data generation means 602. Also, the RAM 510 stores the reference biometric data generated by the data conversion means 604.

Biometric Authentication Means:

The biometric authentication means 606 calculates the matching ratio between the biometric data stored in the RAM 510 and the reference biometric data. The biometric authentication means 606 detects abnormality of the PC 100 on the basis of the matching ratio.

Display Section:

The display section 402 displays the detected abnormality of the PC 100.

Figure 11:
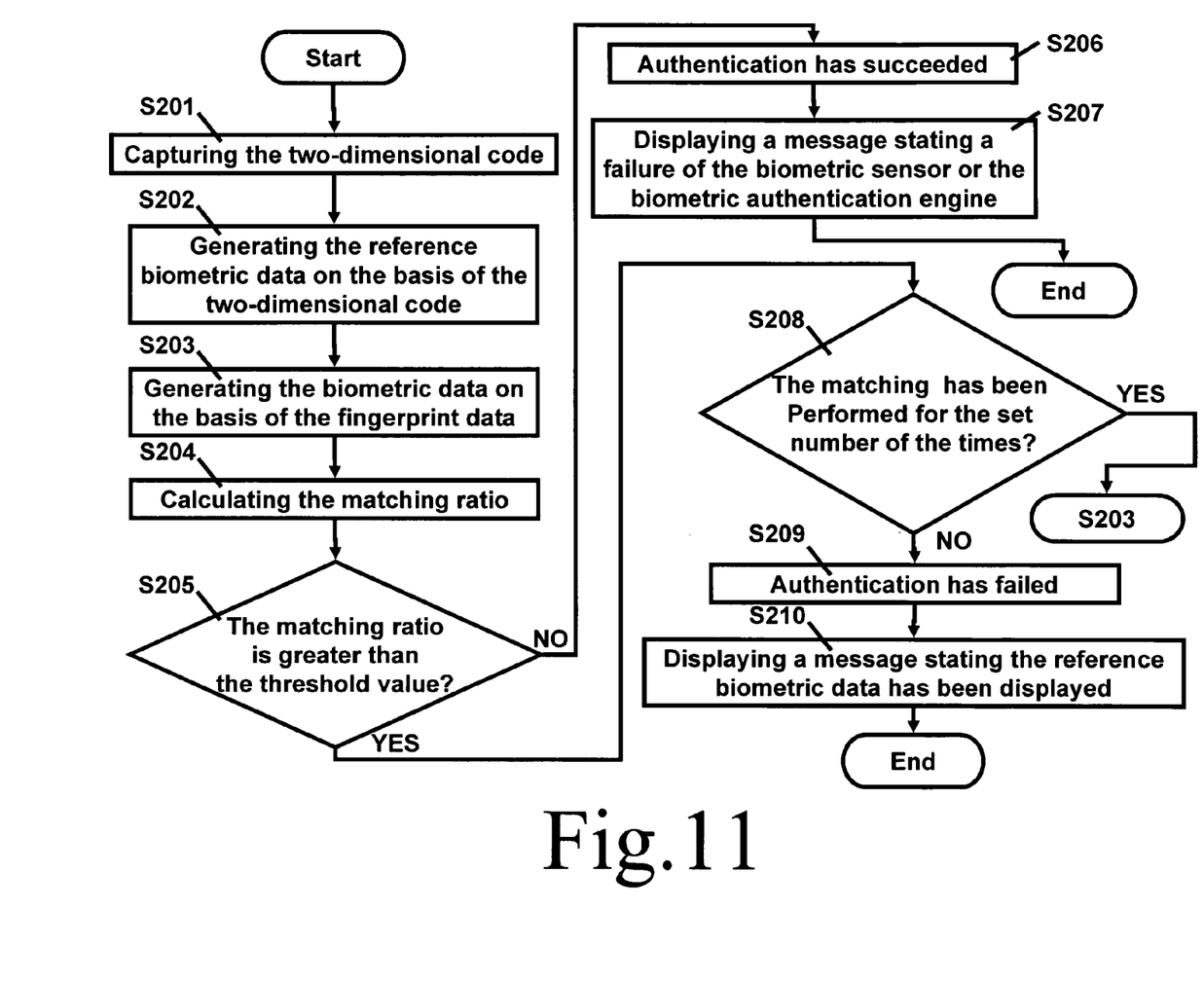
FIG. 11 is a flowchart of the abnormality detection processing.

Abnormality Detection Processing Flow:

In the following, a description will be given of the abnormality detection processing using FIG. 11. Firstly, a maintenance person does checking of operation of the detecting apparatus. In particular, the maintenance person captures his reference biometric data converted into second dimensional code by the imaging device 408 and generates his biometric data by the biometric sensor 406. The maintenance person makes the detecting apparatus perform a biometric authentication on the basis of the reference biometric data captured by the imaging device 408 and biometric data generated by the biometric sensor 406. Then the maintenance person determines whether the authentication has succeeded. Upon successful of the authentication the maintenance person assures the detecting apparatus works properly.

Figure 6:
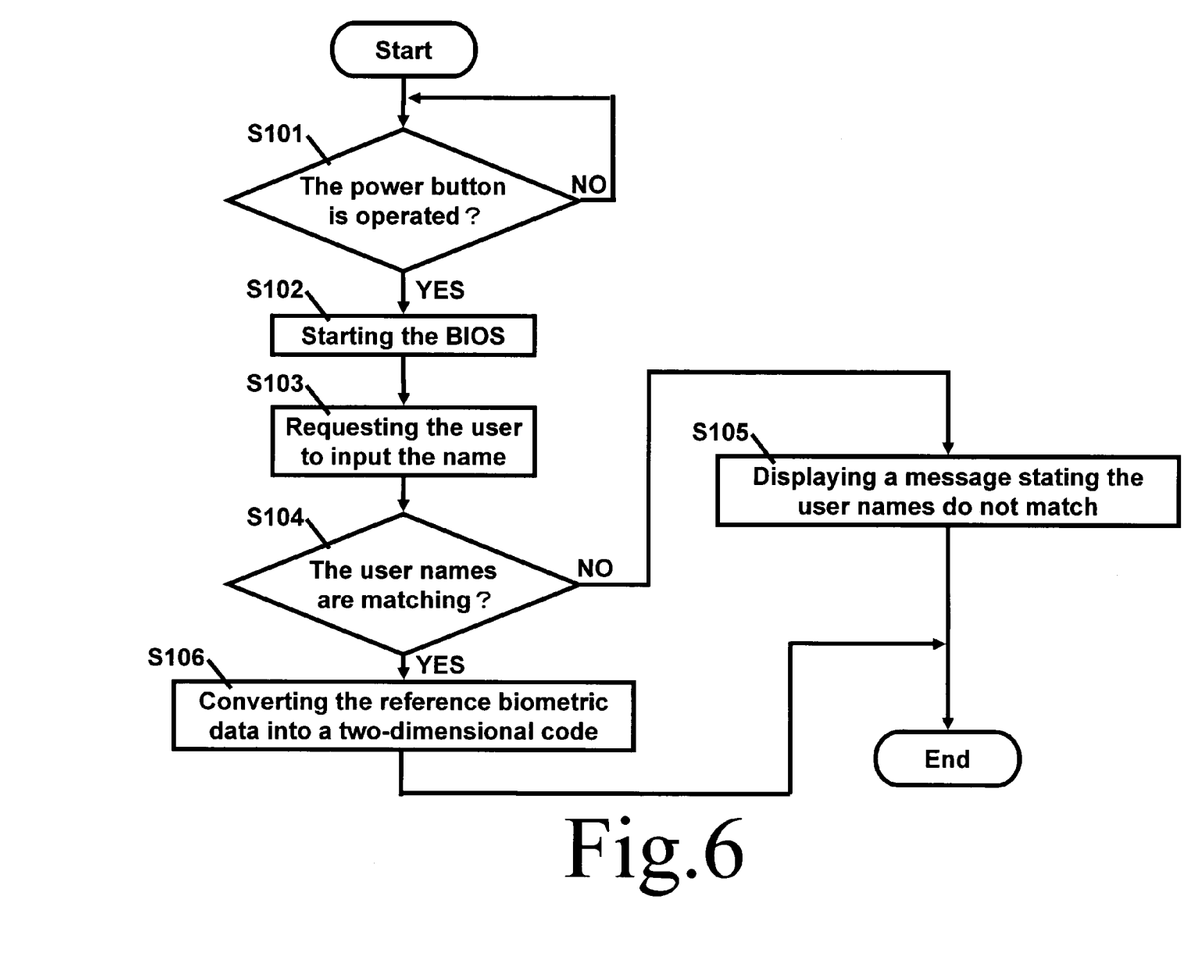
FIG. 6 is a flowchart of the BIOS processing in security mode.
Figure 7:
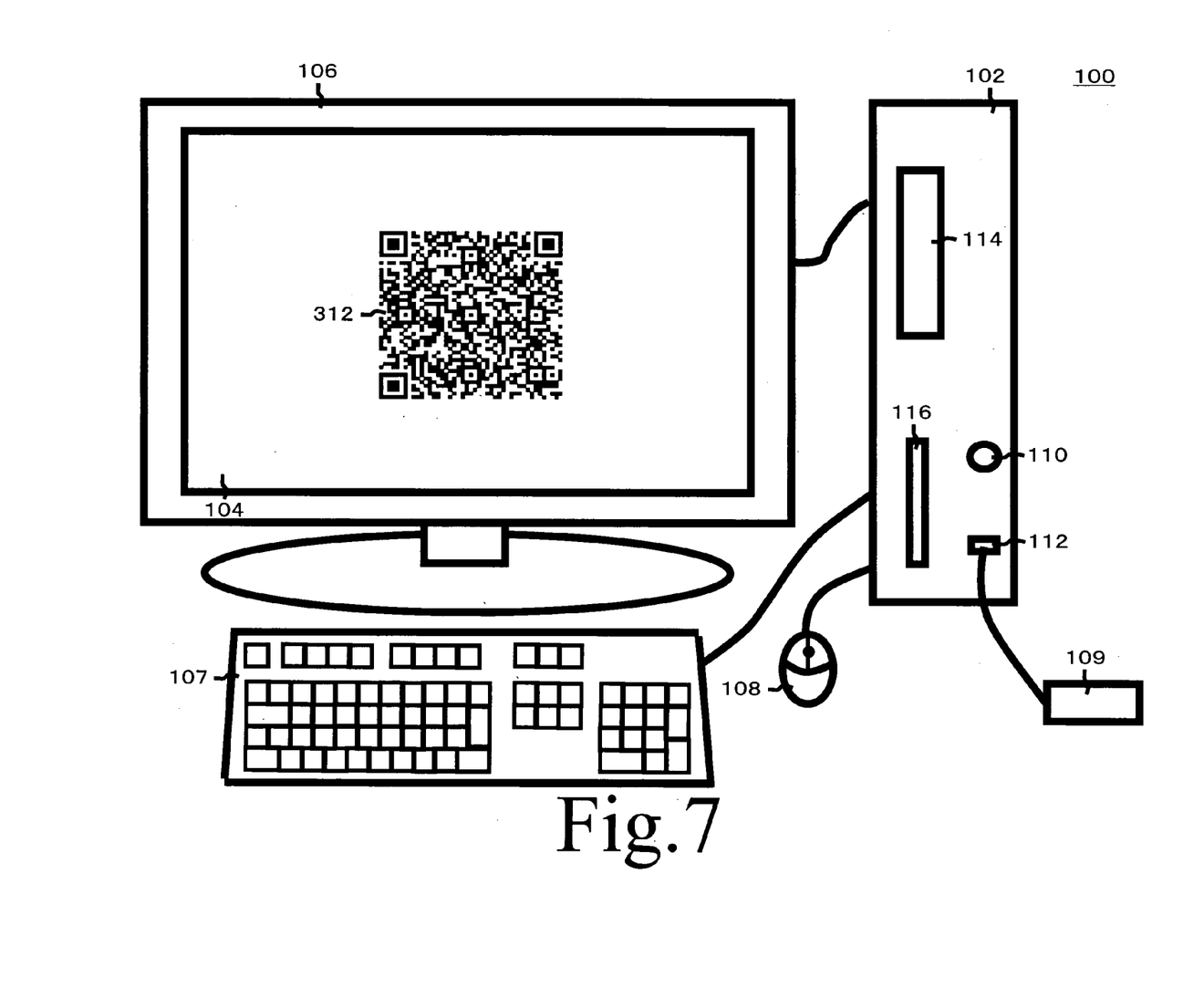
FIG. 7 is a view displaying a two-dimensional code on the display screen of the personal computer.

In step S201, the imaging device 408 captures the two-dimensional code displayed on the display screen 104 of the PC 100 in step S106 in FIG. 6. The processing proceeds to step S202.

In step S202, the data conversion means 604 generates the reference biometric data on the basis of the two-dimensional code captured in step S201, and stores the data into the RAM 510. The processing proceeds to step S203.

In step S203, the biometric-data generation means 602 generates the biometric data on the basis of the user's fingerprint data read by the biometric sensor 406, and stores the data into the RAM 510. The processing proceeds to step S204.

In step S204, the biometric authentication means 606 calculates the matching ratio between the reference biometric data generated in step S202 and the biometric data generated in step S203. The processing proceeds to step S205.

In step S205, the biometric authentication means 606 compares the matching ratio calculated in step S204 and the threshold value set by the user. The biometric authentication means 606 determines whether the matching ratio is greater than the threshold value. If the matching ratio is greater than the threshold value, the processing proceeds to step S206, and the biometric authentication means 606 determines that the authentication has succeeded. The processing proceeds to step S207, and the biometric authentication means 606 displays a message stating a failure of the biometric sensor or the biometric authentication engine to the display section 402. Thus, it is possible to ensure that the reference biometric data stored in the non-volatile memory 218 of the PC 100 is not destroyed. Also, since the biometric sensor 406 connected to the detecting apparatus 400 is assumed be normal, it is possible for the detecting apparatus 400 to detect abnormality in the biometric sensor 109, which is generation means for generating the biometric data, or in the biometric authentication engine 304. Furthermore, although omitted to be shown in the flowchart, it is possible to detect whether the biometric sensor 109 or the biometric authentication engine 304 is abnormal by connecting the biometric sensor 109 to the detecting apparatus 400 and performing the biometric authentication. On the other hand, if the matching ratio is not greater than the threshold value, the processing proceeds to step S208.

In step S208, the biometric authentication means 606 determines whether the matching has been performed for a set number of times. If the matching has been performed for the set number of times, the processing proceeds to step S209, and the biometric authentication means 606 determines that the authentication has failed. The processing proceeds to step S210, and the biometric authentication means 606 displays a message stating that the reference biometric data has been destroyed onto the display section 402. By this means, it is possible to ensure that the biometric sensor 109 connected to the PC 100 is normal. Also, since the biometric sensor 406 connected to the detecting apparatus 400 is assumed be normal, it is possible to detect abnormality in the reference biometric data stored in the non-volatile memory 218 of the PC 100. On the other hand, if the matching has not been performed for the set number of times, the processing returns to step S203, and the user is requested to place his/her finger on the biometric sensor 406 again. The above-described processing is repeated, and the biometric authentication is performed. In this regard, it is desirable to set the number of matching times to a value allowing to determine whether the user misplaced his/her finger or the reference biometric data is abnormal.

As described above, in step S207, it is possible to detect whether the biometric sensor 109 used for generating the user's biometric data or the biometric authentication engine 304 is abnormal. Also, in step S210, it is possible to detect that the reference biometric data stored in the PC 100 is abnormal.

The above embodiment has been described specifically in order to give better understanding of the present inventions and another embodiment is not restricted. Accordingly, various changes may be made in the invention without departing from the spirit and scope thereof.

What is claimed is:

1. A failure diagnosis method of a first apparatus including an inputting unit for inputting biometric data of a user, a storage for storing reference biometric data of the user and a biometric authentication engine for performing authentication by comparison of the biometric data of the user inputted by the inputting unit and reference biometric data of the user stored in the storage, and a display for displaying data, the method comprising:
- outputting said reference biometric data on the display of the first apparatus;
- obtaining said reference biometric data outputted on the display of the first apparatus by a second apparatus;
- inputting new biometric data of the user by using the second apparatus;
- performing authentication to the first apparatus by comparison of said reference biometric data obtained by the second apparatus from the first apparatus with the new biometric data input using the second apparatus; and
- determining a cause of a failure of the authentication, and
- where the determining provides an indication a first message that identifies the inputting unit of the first apparatus as the cause of the failure upon success of the authentication to the first apparatus by the second apparatus, and a second message that identifies said reference biometric data stored in the first apparatus as the cause of the failure upon failure of the authentication by the second apparatus when said reference biometric data obtained from the first apparatus does not match reference data stored in the first apparatus.

2. The failure diagnosis method of claim 1, wherein said reference biometric data is output as encrypted data.

3. The failure diagnosis method of claim 1, wherein said reference biometric data is output as second dimensional code.

4. The failure diagnosis method of claim 1, wherein said reference biometric is output when the first apparatus is out of service.

5. The failure diagnosis method of claim 1, wherein the displaying displays data transformed from the reference biometric data, the obtaining of said reference biometric data outputted includes obtaining the data and transforming the data into the reference biometric data.

6. A system comprising:
- a first apparatus including an inputting unit configured to input biometric data of a user, and a storage configured to store reference biometric data of the user and a biometric engine configured to perform authentication by comparison of the biometric data of the user inputted by the inputting unit and the reference biometric data of the user stored in the storage, for allowing log-in by the user upon successful authentication performed by the biometric engine, and upon failure of the authentication outputting said reference biometric data on a display of the first apparatus; and
- a second apparatus for estimating a type of the first apparatus having a central processing unit for controlling the process of estimating the failure of the first apparatus to be carried out by the second apparatus, the process comprising:
  - obtaining said reference biometric data outputted on the display of the first apparatus;
  - inputting new biometric data of the user using the second apparatus;
  - performing authentication to the first apparatus by comparison of said reference biometric data obtained by the second apparatus from the first apparatus with said new biometric data input using the second apparatus; and
  - determining a cause of a failure of the authentication, and
- where the determining provides a first message that identifies the inputting unit of the first apparatus as the cause of the failure upon success of the authentication by the second apparatus and a second message that identifies said reference biometric data stored in the first apparatus as the cause of the failure upon failure of the authentication by the second apparatus when said reference biometric data obtained from the first apparatus does not match reference data stored in the first apparatus.

7. The system of claim 6, wherein said reference biometric data is output as encrypted data.

8. The system of claim 6, wherein said reference biometric data is output as second dimensional code.

9. The system of claim 6, wherein said reference biometric is output when the first apparatus is out of service.

* * * * *